United States Patent [19]

Chaumette et al.

[11] Patent Number: 5,108,046

[45] Date of Patent: Apr. 28, 1992

[54] AERODYNAMIC BRAKING DEVICE

[75] Inventors: Daniel Chaumette, Suresnes; Jean-François Puech, Mareil Sur Mauldre, both of France

[73] Assignee: Dassault Aviation, Vaucresson, France

[21] Appl. No.: 680,359

[22] Filed: Apr. 4, 1991

[30] Foreign Application Priority Data

Apr. 13, 1990 [FR] France .................. 90 04807

[51] Int. Cl.⁵ .............................. B64G 1/62
[52] U.S. Cl. ...................... 244/110 D; 244/160; 244/138 R
[58] Field of Search .......... 244/110 D, 158 R, 158 A, 244/160, 113, 138 R; 102/337, 339, 348, 386, 387, 405

[56] References Cited

U.S. PATENT DOCUMENTS

| | | | |
|---|---|---|---|
| 3,118,636 | 1/1964 | Kantrowitz et al. | 244/113 |
| 3,405,887 | 10/1968 | Mixson | 244/160 |
| 3,433,435 | 3/1969 | Alai | 244/160 |
| 3,604,667 | 9/1971 | Moraes | 102/386 |
| 3,888,175 | 6/1975 | Dusoe et al. | 102/386 |
| 4,817,895 | 4/1989 | Scott et al. | 244/160 |
| 4,832,288 | 5/1989 | Kendall et al. | 244/158 A |
| 4,856,432 | 8/1989 | Synofzik | 102/386 |
| 4,860,660 | 8/1989 | Synofzik et al. | 102/386 |
| 4,903,918 | 2/1990 | Park et al. | 244/160 |

OTHER PUBLICATIONS

Journal of Spacecraft and Rockets, vol. 4, No. 6, Jun. 1967, pp. 720-725, J. A. Alai, "Tension String Structure for Planetary Entry Vehicles".

*Primary Examiner*—Joseph F. Peters, Jr.
*Assistant Examiner*—Anne E. Bidwell
*Attorney, Agent, or Firm*—Stevens, Davis, Miller & Mosher

[57] ABSTRACT

Aerodynamic braking device, intended in particular for decelerating a space object penetrating an atmosphere at high speed, essentially constituted by a circular ring (2) made from canvas, of general shape close to that of a truncated cone but whose cross-section through an axial plane exhibits an outward concavity, and by a supporting structure (6, 7, 8) designed to apply a tangential tensile stress to the said ring in an axial plane, and preferably comprising at least two parallel rigid rings (6, 7), between which the canvas ring is stretched, and struts (8) arranged in order to retain the distance between the two rigid rings by resisting the loads resulting from the tension of the canvas.

12 Claims, 2 Drawing Sheets

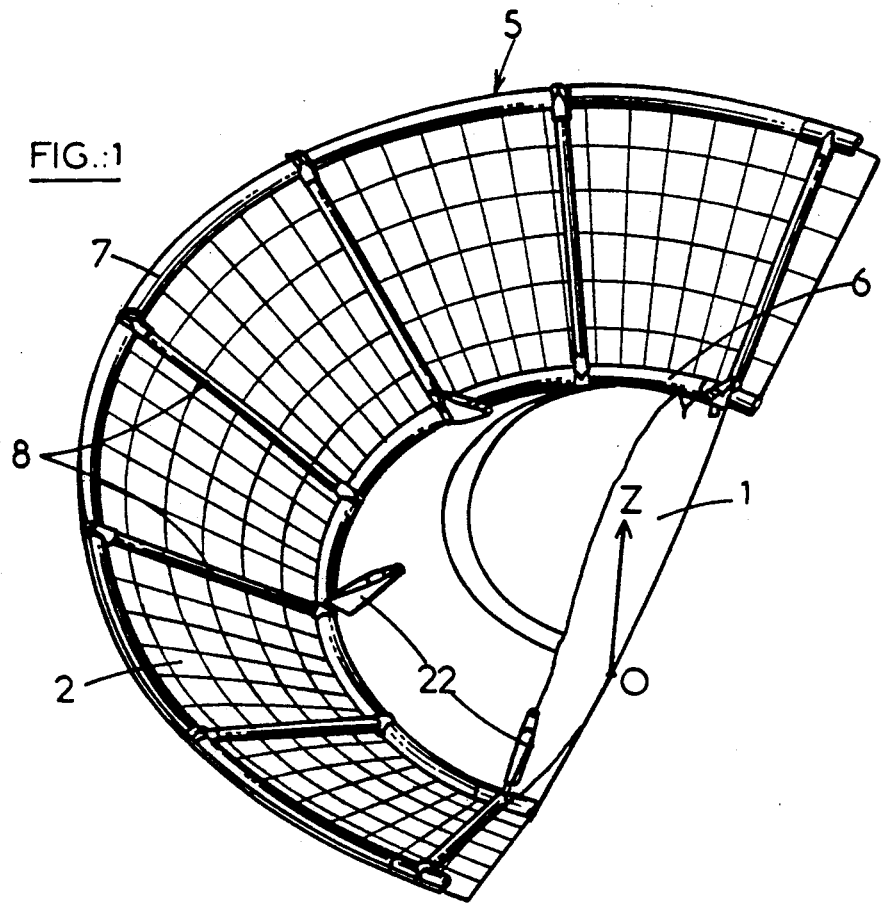
FIG.:1
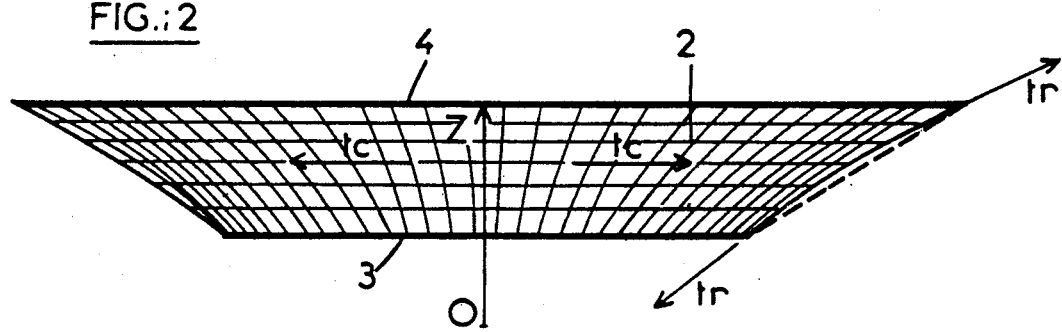
FIG.:2

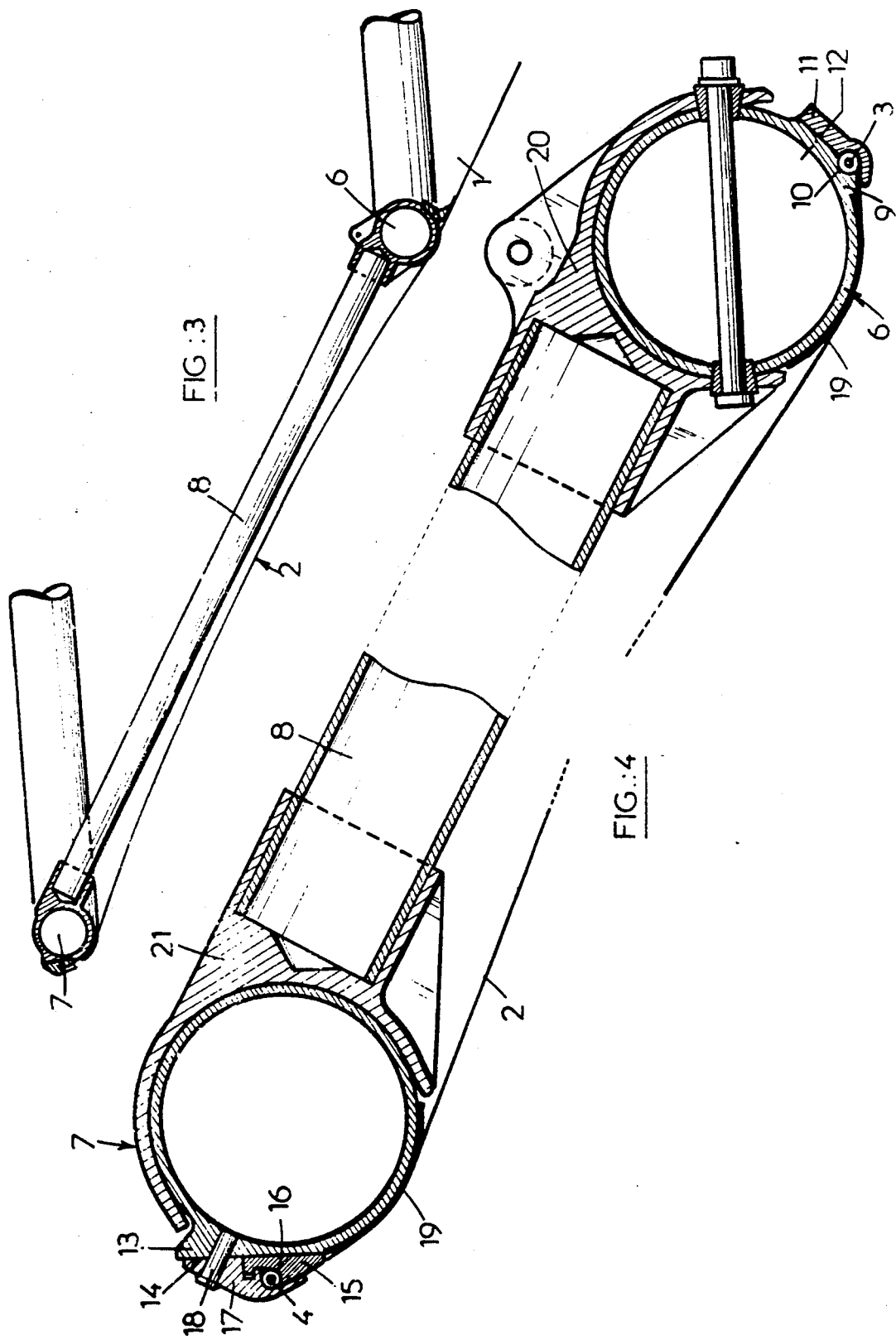

AERODYNAMIC BRAKING DEVICE

STATE OF THE ART

The present invention relates to an aerodynamic braking device intended in particular for decelerating a space object penetrating an atmosphere at high speed.

The design of a device for decelerating a space object, such as a measuring probe, which penetrates an atmosphere, for example of a planet, at high speed, should take account of a large number of constraints. The device should be of lowest possible weight, it should exhibit a stable geometric shape and not be subject to uncontrollable phenomena of flutter or oscillations. It should be robust, be able to withstand prolonged storage at very low temperatures and in the interstellar vacuum, and also be able to withstand, during the period anticipated for penetrating the relevant atmosphere, the mechanical and thermal stresses resulting from this penetration.

It should however be observed that the invention should, if possible, be applicable, at least in its principle, to equipment which is intended to meet less severe demands than those which result from these extreme conditions.

In the U.S. Pat. No. 4,832,288 there has been proposed a braking device constituted by a truncated-conical canvas ring retained, over its portion of largest diameter, by an inflatable frame. This solution has the disadvantage that the canvas, on contact with an aerodynamic flow, exhibits phenomena referred to as flutter, by analogy with the behaviour of a flag positioned in the wind, that is to say wave-like phenomena which can attain large magnitude, and become practically uncontrollable. A means, generally known, of suppressing such phenomena would be to retain the canvas under a high biaxial tension, but this is not suggested in the document cited. On the contrary, it appears that the flutter is further accentuated here by the lack of rigidity of the inflatable frame.

In "Journal of Spacecraft and Rockets," vol. 4, No. 6, June 1967, pages 720-725, there has been described a braking device whose essential component is a collection of stretched threads, retained by an equatorial ring and front and back rings, carried by a central tubular support positioned inside the equatorial ring, and coaxial with it. The threads are positioned by winding, obliquely relative to the axis of the ring, so that they form two surfaces which are opposed by their base and almost truncated-conical, more precisely each in the shape of a hyperboloid of revolution with concavity turned away from the axis. The threads are stuck to the ring, and preferably coated with elastomeric material.

Two superposed windings are provided, the threads of one winding making an angle with the axis which is opposite in direction to that of the other winding, and it is possible to obtain an intertwining of the threads by changing the direction of coiling. The threads are linked to the planetary ring and can be interlocked by a covering of elastomeric material.

A particular feature of this device is that at a point of the surface of the collection of stretched threads the resistance to deformation is at a maximum in the directions of the stretched threads which intersect at this point, and a minimum in the axial and equatorial directions, which are those in which the loads due to the action of the atmosphere are greatest. Good resistance to the phenomenon of flutter can therefore be obtained only by very large tensions in the threads, this imposing an undesired addition in weight. Moreover, the equatorial ring is retained only by the tension of the threads, and only a very high tension in the threads of the two sheets would be able to prevent oscillatory displacements of this ring, either by translation in an axial direction, in a radial direction, or by pivoting around diametral axes.

Thus, the prior art device described exhibits a marked tendency to aerodynamic instability, barring a very high tension in the threads, which would impose an unacceptable surfeit in weight. Furthermore, one of the almost truncated-conical surfaces is ineffective and hampers access to the space situated behind the surface which serves in the braking.

The aim of the present invention is to furnish a braking device which is of a lightness comparable to that of the known devices, while exhibiting much higher resistance to the phenomena of flutter.

SUMMARY OF THE INVENTION

In consequence, the invention provides an aerodynamic braking device, intended in particular for decelerating a space object penetrating an atmosphere at high speed, constituted by a canvas ring of almost truncated-conical shape and by a supporting structure designed to retain said canvas ring under tension, characterized in that the canvas is arranged with threads in an almost axial direction and threads in an almost equatorial direction, and in that said canvas ring exhibits a concavity directed radially away from the axis, and in that the supporting structure comprises at least two rigid rings, acting on the largest and smallest diameter portions of the canvas ring and connected between them by rigid struts which exert on said rigid rings an axial force tending to separate them, so that, because of the concavity of the canvas ring, said canvas is subjected, between said rigid rings, to a biaxial tension along the axial and equatorial directions.

It is appreciated that the stress exerted on the canvas ring tends to reduce its concavity so as to approximate its shape to that of a truncated cone, by increasing the diameter of the equatorial circles, and that the threads, by their arrangement, resist this tendency so as to form a highly stretched assembly.

Moreover, the presence of the rigid struts confers on the supporting structure an overall rigidity which opposes any relative oscillatory displacement of the rings. Hence there results a both rigid and very light assembly.

Advantageously, the edges of the canvas ring are provided with boltropes which are each held in a groove of the corresponding rigid ring, which groove is positioned in such a way that the inner face of the canvas ring bears on the rigid ring. In a preferred arrangement, the groove of the larger rigid ring is carried by a member independent of the rest of the ring, and capable of sliding on it along a cylindrical surface parallel to the axis of the device.

In all cases, in a desire for safety, it is provided that the boltropes are retained in their groove by annular locking members.

The preferred embodiments which will follow relate more especially to a device according to the invention and which, during use, is subjected to high temperatures.

Advantageously, the shape and arrangement of the struts are calculated in order that, when in use, the canvas does not come into contact with the said struts. This can be obtained with struts which are curvilinear, or off-centred relative to the rigid rings, or simply of small cross-section relative to that of the rigid rings. Contact with the canvas, rendered very hot by the friction of the atmosphere, would occasion a poorly controlled local overheating of the strut, which could deform and/or lose a portion of its mechanical properties.

Also advantageously, the coefficient of expansion of the canvas is lower than that of the material of the rigid rings and of the struts, and the tension of the canvas is calculated in order that, when in use, the overheating and the differences of expansion engender an increase in the tension of the canvas which brings this tension to the desired value.

Again advantageously, the material of the canvas and that of the rigid rings and of the struts are chosen in order that the canvas can withstand high temperatures and that the rigid rings and the struts rapidly diffuse heat from the points of contact of the canvas with the rigid rings so as to avoid a local overheating of the rings in the vicinity of these points of contact.

BRIEF DESCRIPTION OF THE DRAWINGS

The invention will now be explained in greater detail with the aid of a practical example illustrated with the drawings in which:

FIG. 1 is a perspective half-view of the assembly of an aerodynamic braking device according to the invention, FIG. 2 is a side view of the canvas ring, FIG. 3 is a partial section of the device along an axial plane, FIG. 4 is a view similar to FIG. 3, but showing on a larger scale the end regions of a strut.

DETAILED DESCRIPTION OF THE PREFERRED EMBODIMENT OF THE INVENTION

FIG. 1 shows a braking device intended to be used during penetration into an atmosphere of a central body 1, which is represented symbolically and which may be a collection of measuring instruments carried by a support, the measuring instruments and the support occupying almost a volume of revolution, only the outer contour of which has been drawn.

The device essentially comprises a canvas ring, of almost truncated-conical general shape, edged on its inner edge, that is to say the one of smallest diameter, by a boltrope 3, and on its opposite edge by another boltrope 4. Here, boltrope designates a portion of the fabric which is folded back and stitched onto itself, while surrounding an appropriate tension-resisting circular cable.

In the example described, the canvas 2 is made from carbon fabric, of which the texture and the size of the thread have been chosen so as to afford the appropriate mechanical and aerodynamic resistance, as well as strength at the application temperatures, which may attain about 1500° C. Appropriate canvases are marketed in France by the Company BROCHIER.

The canvas can be constituted by several flat panels joined by stitching parallel to the struts, but preferred solution is the use of a single-member canvas ring, woven into shape, without stitching outside the boltrope regions. The advantage of this arrangement is to not have stitching in the hottest regions, that is to say the regions separated from the rigid rings. The stitching for the boltropes is in fact cooled by the "thermal well" effect of the rings.

Another advantage of the woven-into-shape canvas ring is that it has weft threads precisely in planes parallel to the axis, and warp threads in planes perpendicular to the axis. With a canvas ring constituted by several stitched panels, this result is obtained only approximately, from which follows a greater deformability of the canvas ring under aerodynamic stresses.

The shape of the canvas ring 2 is not precisely truncated-conical. In fact, the diameter of the radial cross-sections which are intermediate between the extreme cross-sections, corresponding to the boltropes 3 and 4, is less than it would be if the ring were precisely truncated-conical. The separation gradually increases from the ends up to the zone situated half-way between the ends, where it is about 5% relative to the theoretical value which would correspond to a perfect truncated cone. This is clearly visible in FIG. 2, in which the shape of the ring 2 has been represented, and with dashes, the shape which would correspond to a perfectly truncated-conical surface.

The canvas ring 2 is stretched over a structure denoted overall by numeral 5, and which comprises an inner rigid ring 6, an outer rigid ring 7, and struts 8 connecting these two rings.

As FIG. 4 clearly shows, the inner ring 6 is a tubular ring whose transverse cross-section is almost circular but which includes a thicker portion 9 into which is sunk a groove 10 of shape and dimension which are suitable to receive the corresponding boltrope 3. A retaining member 11 is arranged so as to retain the boltrope 3 in position. The member 11 is fixed to the tubular ring 6 by rivets 12. The outer ring 7 is also constituted by a tubular member, with substantially circular cross-section, but with a thickening 13 exhibiting an external face 14 which constitutes a cylindrical surface with axis parallel to the axis OZ of the device as a whole. A bearing member 15, which carries a groove 16 intended to receive the outer boltrope 4, can glide on this cylindrical surface. A retaining member 17 prevents the boltrope 4 freeing itself once it is in position.

Given what goes before, the manner of fitting the canvas onto the rigid structure is readily appreciated: firstly, the inner boltrope 3 is immobilized between the slot 10 and the retaining member 11, then the outer boltrope 4 is positioned between the members 15 and 17, and these members are slid parallel to the axis, along the cylindrical surface 14. There is thus obtained a symmetrical and even tension in the canvas 2, which will become stretched by bearing on the wall of the rigid rings 6 and 7. This tension is represented by the arrows tr in FIG. 2. When the appropriate tension is obtained, the members 15 and 17 are immobilized by rivets 18 which penetrate into the rigid ring 6.

It will be appreciated that the radial tension tr engenders, by virtue of the non-conical shape of the canvas ring 2, a tension tc in the canvas in the tangential direction in a plane perpendicular to the axis.

The result of the existence of a state of biaxial tension is good stability under the effect of aerodynamic flows, and thus minimization of the effects of flutter.

A layer of thermally insulating material 19 is provided between the canvas 2 and the rigid ring 6 and between the canvas 2 and the rigid ring 7. In practice, this is porous silica.

The struts 8 are tubular members fixed at their ends to the rigid rings 6 and 7 by means of fittings 20, 21. It will be noted, as is clearly visible in FIGS. 3 and 4, that the struts 8 are off-centered relative to the tubular rings 6 and 7, and offset away from the canvas. FIG. 3 shows the reason for this arrangement: the canvas 2, despite the fact that it exhibits an outward concavity, should not come into contact with the struts. The separation between the axis of a strut 8 and the centre of the transverse cross-section of the rigid rings 6 and 7 should be calculated so as to avoid this contact, given the shape of the canvas, its state of tension, and the aerodynamic stresses which it undergoes.

FIG. 1 shows that the inner ring 6 is linked to the central body 1 by connecting fittings 22. The latter bear against the fittings 20 for connecting the struts with the lower ring. FIG. 1 shows that the number of these connecting fittings is equal to half the number of struts. It is obvious that the number of connecting fittings can be changed without departing from the invention.

According to the construction described, the rigid rings, the struts and the various auxiliary members are made from beryllium. Beryllium has the advantage of great lightness, good strength at high temperatures, and above all very good diffusivity, that is to say that the heat which it receives at a point of its bulk is widely diffused to the member as a whole, thus avoiding any local overheating which could compromise the strength of the device. Note that diffusivity corresponds to thermal conductivity divided by heat capacity and by density. Furthermore, the coefficient of expansion of beryllium is of the order of 16 times greater than that of the material adopted for the canvas 2, that is to say carbon. For this reason, when entering an atmosphere, the consequence of an overheating of the support structure is an appreciable increase in the tension in the canvas 2. On the one hand the latter is thus rendered less sensitive to the risks of aerodynamic phenomena of flutter, and on the other hand it tends to separate from the struts.

By contrast, at low temperatures the tensions are reduced, still through the effect of the difference in the coefficients of expansion which reduces the risks of creep during long-term storage.

The geometry of the device, the materials used, the number of struts, the nature of the materials, the dimension of the mesh of the canvas etc. are to be chosen in each case as a function of the relevant problem. Structures which can be folded prior to use can also be envisaged. It is also possible to devise more complicated devices, in which a canvas ring has several successive outward concavities in the axial direction, and is stretched over several successive rigid rings.

We claim:

1. An aerodynamic braking device, intended in particular for decelerating a space object penetrating an atmosphere at high speed, constituted by a canvas ring of almost truncated-conical shape with a concavity directed radially away from the axis, the canvas being arranged with threads in an almost axial direction and threads in an almost equatorial direction, and by a supporting structure which comprises at least two rigid rings, acting on the largest and smallest diameter portions of the canvas ring and connected between them by rigid struts which exert on said rigid rings an axial force tending to separate them, so that, because of the concavity of the canvas ring, said canvas is subjected, between said rigid rings, to a biaxial tension along the axial and equatorial directions.

2. The device of claim 1, in which the edges of the canvas ring are provided with boltropes which are each held in a groove of the corresponding rigid ring, which groove is positioned in such a way that the inner face of the canvas ring bears on the rigid ring.

3. The device of claim 2, furthermore comprising insulating material inserted in each case between the inner face of the canvas and the adjacent rigid ring.

4. The device of claim 2, in which the groove of the said larger rigid ring is carried by a member independent of the rest of the ring, and capable of sliding on it along a cylindrical surface parallel to the axis of the device.

5. The device of claim 2, in which the boltropes are retained in their groove by annular locking members.

6. The device of claim 1, in which the shape and the arrangement of the struts are calculated in order that, when in use, the canvas does not come into contact with the said struts.

7. The device of claim 1, in which the coefficient of expansion of the canvas is lower than that of the material of the rigid rings and of the struts, and the tension of the canvas is calculated in order that, when in use, the differences of expansion engender an increase in the tension of the canvas which brings this tension to the desired value.

8. The device of claim 1, in which the canvas ring is woven in a single member.

9. The device of claim 1, in which the material of the canvas and that of the rigid rings and of the struts are chosen in order that the canvas can withstand high temperatures and that the rigid rings and the struts rapidly diffuse heat from the points of contact of the canvas with the rigid rings so as to avoid a local overheating of the rings in the vicinity of these points of contact.

10. The device of claim 9, in which the canvas is made from carbon fabric.

11. The device of claim 9, in which the rigid rings and the struts are made from beryllium.

12. The device of claim 9, in which the canvas is made from carbon fabric and the rigid rings and struts are made from beryllium.

* * * * *